US012557945B2

(12) United States Patent
Aumiller et al.

(10) Patent No.: US 12,557,945 B2
(45) Date of Patent: Feb. 24, 2026

(54) SYSTEMS AND METHODS FOR A ROBOT-ADAPTED CUTTING BOARD AND KNIFE

(71) Applicant: Samsung Electronics Company, Ltd., Suwon si (KR)

(72) Inventors: Curtis D. Aumiller, San Jose, CA (US); Sajid Hassan Sadi, San Jose, CA (US); Jun Yeon Cho, San Jose, CA (US); Brian Harms, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 586 days.

(21) Appl. No.: 17/353,175

(22) Filed: Jun. 21, 2021

(65) Prior Publication Data

US 2022/0400905 A1 Dec. 22, 2022

(51) Int. Cl.
*A47J 47/00* (2006.01)
*B25J 15/08* (2006.01)
(Continued)

(52) U.S. Cl.
CPC .......... *A47J 47/005* (2013.01); *B26D 1/0006* (2013.01); *B26D 1/30* (2013.01); *B26D 5/08* (2013.01);
(Continued)

(58) Field of Classification Search
CPC ....... A47J 47/005; B25J 15/08; B26D 1/0006; B26D 1/30; B26D 2001/004; B26D 5/08; B26D 7/2614
(Continued)

(56) References Cited

U.S. PATENT DOCUMENTS

| 472,006 | A | * | 3/1892 | Walker | .................... | B26B 29/02 |
| | | | | | | 30/295 |
| 1,022,176 | A | * | 4/1912 | Boothby | .................. | B27C 5/06 |
| | | | | | | 144/243 |

(Continued)

FOREIGN PATENT DOCUMENTS

| CN | 102658566 | 9/2012 |
| CN | 202607736 | 12/2012 |

(Continued)

OTHER PUBLICATIONS

Samsung U.S. Newsroom, Meet Samsung Bot Chef—A Future Concept for the Connected Home, Jan. 10, 2020, YouTube, https://youtu.be/OD83rmDb3ss?si=KEbbNILzK_OhFggt (Year: 2020).*

*Primary Examiner* — Adam J Eiseman
*Assistant Examiner* — Robert D Cornett

(57) ABSTRACT

In one embodiment, a method includes causing a robotic limb to intercouple with a handle of a knife. The knife comprising a handle at a proximal end where the handle is configured to intercouple with the robotic limb, a bade connected to the handle, and an indentation at a distal end where the indentation is configured to intercouple with a bar of the cutting surface, and where the blade is rotatable around a first axis while intercoupled with the bar. The method includes causing the indentation of the knife to be intercoupled with the bar of a cutting board. The cutting board comprising the cutting surface and the bar affixed to the cutting surface. The method includes adjusting, by the robotic limb the position of the knife along the bar to along with an object on the cutting surface and rotating the knife to cut the object.

20 Claims, 14 Drawing Sheets

(51) Int. Cl.
  *B26D 1/00*    (2006.01)
  *B26D 1/30*    (2006.01)
  *B26D 5/08*    (2006.01)
  *B26D 7/26*    (2006.01)
(52) U.S. Cl.
  CPC ............. *B26D 7/2614* (2013.01); *B25J 15/08*
    (2013.01); *B26D 2001/004* (2013.01)
(58) Field of Classification Search
  USPC ......... 83/375, 395, 451, 466, 302, 872, 876,
    83/640, 504, 500; 269/290
  See application file for complete search history.

(56)                References Cited

U.S. PATENT DOCUMENTS 1,323,425  A  *  12/1919  Townsend ............. B26D 1/245
                                              83/499
1,489,419  A  *   4/1924  Beechlyn ................. B26B 9/02
                                              30/348

| | | | | |
|---|---|---|---|---|
| 4,087,911 | A * | 5/1978 | Schrock ................... | B26B 3/00 30/340 |
| 4,253,650 | A * | 3/1981 | Kuzio .................... | A22C 25/08 452/149 |
| 6,564,685 | B1 * | 5/2003 | Beaton ..................... | B26D 1/30 83/609 |
| 11,213,956 | B2 * | 1/2022 | Lee ..................... | G06F 3/04883 |
| 2010/0229399 | A1 * | 9/2010 | Gleason ............... | B26B 27/007 30/162 |
| 2012/0091646 | A1 * | 4/2012 | Drummond .......... | A47J 47/005 269/293 |
| 2019/0380543 | A1 * | 12/2019 | Bhargava ............. | A47J 47/005 |

FOREIGN PATENT DOCUMENTS

| | | |
|---|---|---|
| CN | 210189936 | 3/2020 |
| JP | 4169123 | 10/2008 |
| JP | 6178163 | 3/2015 |
| KR | 2004616720000 | 7/2012 |
| KR | 1020150061205 | 6/2015 |
| KR | 101709382 | 2/2017 |

* cited by examiner

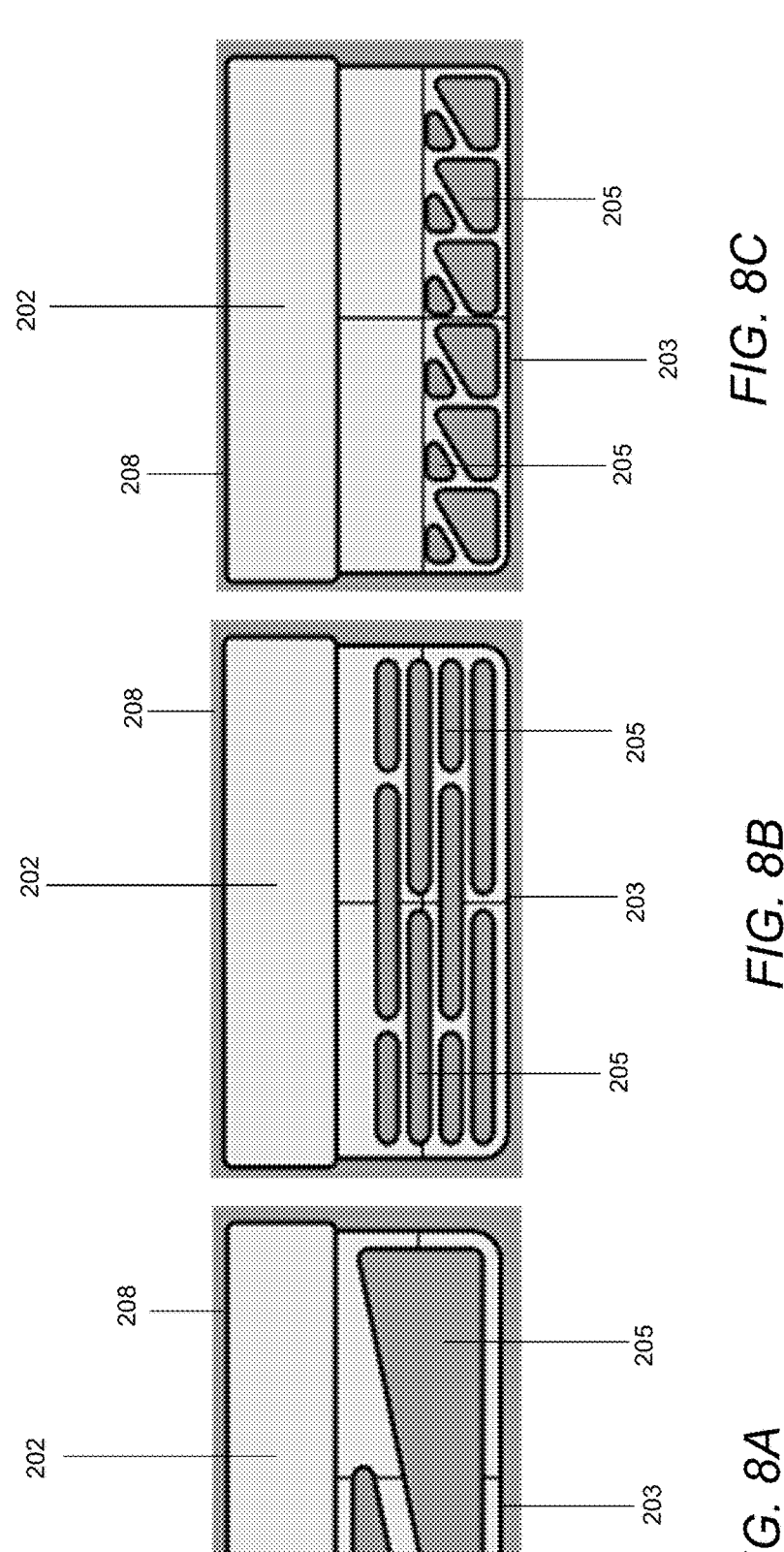

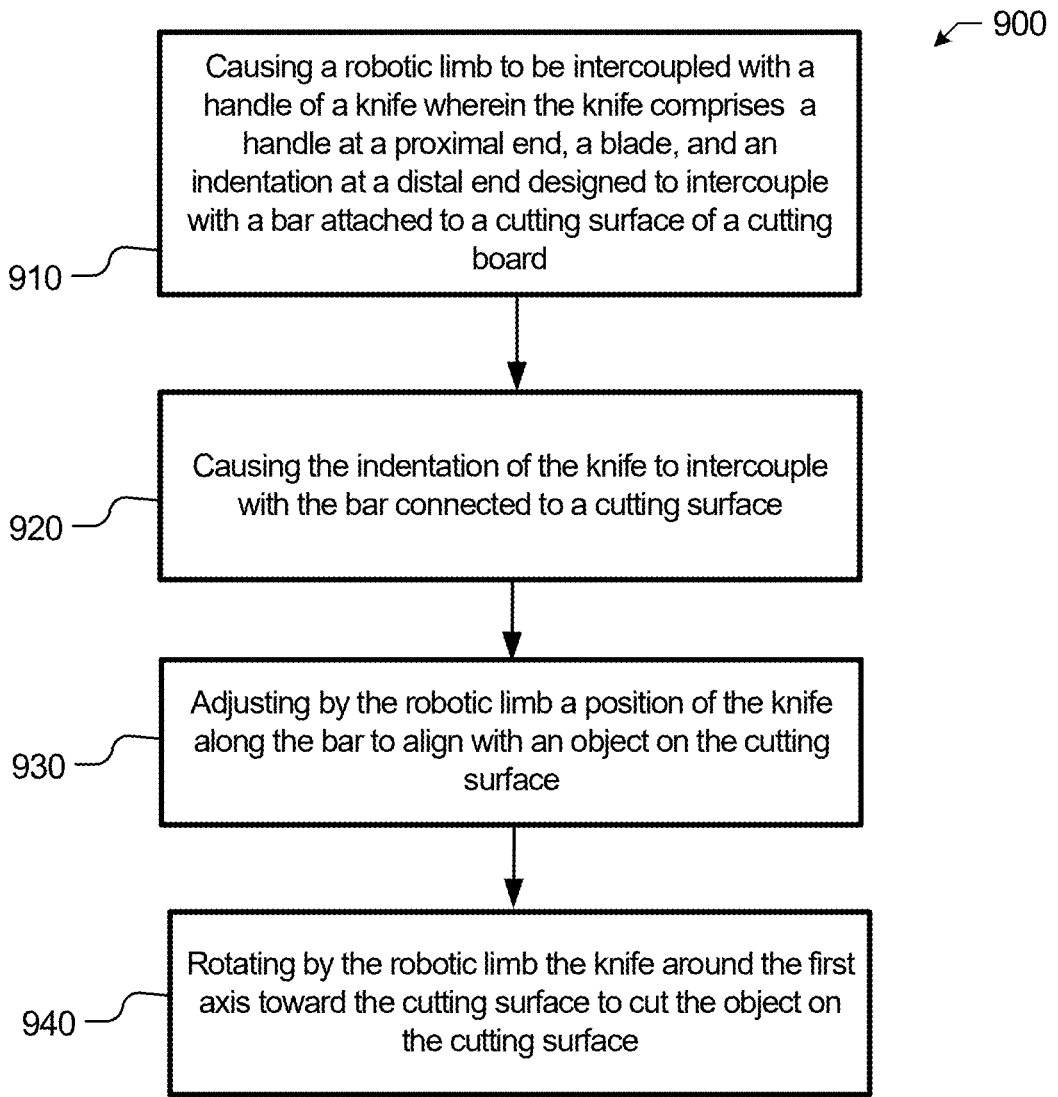

900

910 — Causing a robotic limb to be intercoupled with a handle of a knife wherein the knife comprises a handle at a proximal end, a blade, and an indentation at a distal end designed to intercouple with a bar attached to a cutting surface of a cutting board 920 — Causing the indentation of the knife to intercouple with the bar connected to a cutting surface 930 — Adjusting by the robotic limb a position of the knife along the bar to align with an object on the cutting surface 940 — Rotating by the robotic limb the knife around the first axis toward the cutting surface to cut the object on the cutting surface

*FIG. 9*

SYSTEMS AND METHODS FOR A ROBOT-ADAPTED CUTTING BOARD AND KNIFE

TECHNICAL FIELD

This disclosure relates generally to robotics, and in particular relates to tools adapted for use by a robot.

BACKGROUND

A robot is a machine, especially one programmable by a computer, capable of carrying out a complex series of actions automatically. Robots may be guided by an external control device or the control may be embedded within. Robots may be constructed on the lines of human form, but most robots are machines designed to perform a task with no regard to their aesthetics. Robots may be autonomous or semi-autonomous and range from humanoids to industrial robots, medical operating robots, patient assist robots, dog therapy robots, collectively programmed swarm robots, UAV drones, and even microscopic nano robots. By mimicking a lifelike appearance or automating movements, a robot may convey a sense of intelligence or thought of its own.

The branch of technology that deals with the design, construction, operation, and application of robots, as well as computer systems for their control, sensory feedback, and information processing is robotics. These technologies deal with automated machines that can take the place of humans in dangerous environments or manufacturing processes, or resemble humans in appearance, behavior, or cognition.

Robots can be designed and configured to carry out human-like tasks such as household related activities. Household related activities may include cooking and related tasks such as preparing and cutting food items. While humans are capable of performing household tasks with a wide array of tools and appliances, sometimes the design and aesthetics of robots require specially designed systems and apparatuses to carry out those same tasks.

BRIEF DESCRIPTION OF THE DRAWINGS

FIGS. 8A-8C illustrate example blades comprising a plurality of holes.

FIG. 9 illustrates an example method for implementing a robot-adapted cutting board and knife.

DESCRIPTION OF EXAMPLE EMBODIMENTS

Robotic System Overview

Figure 1:
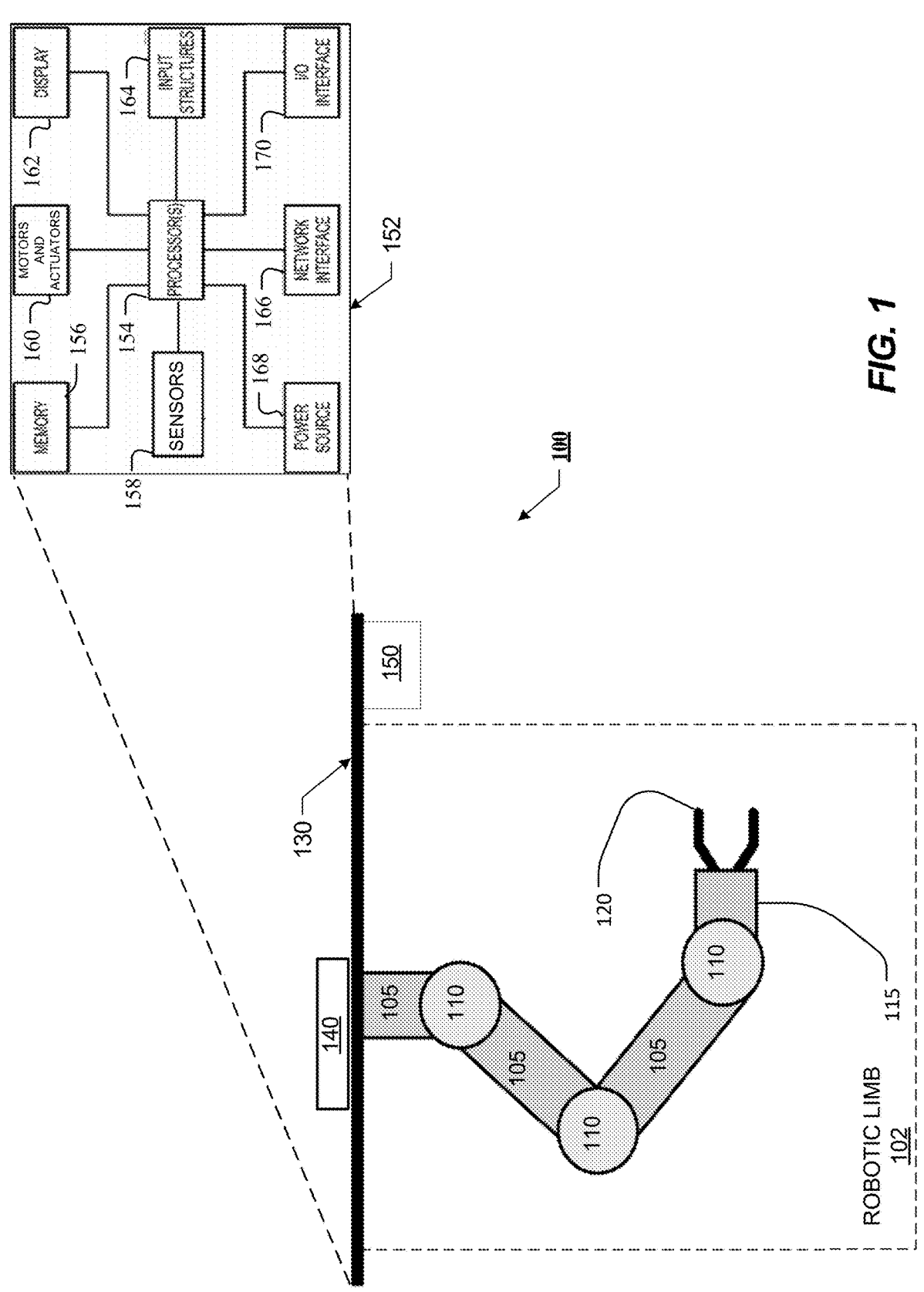
FIG. 1 illustrates an example robotic limb and apparatus.

This disclosure describes systems and methods that combine lightweight and low-cost components with captured sensor data from one or more sensors, such as image sensors, to increase the accuracy and precision of the robotic system through software. Image sensors are often affordable relative to robotic limb components and can be accurate for measuring distances and poses of objects within their respective fields of view.

In particular embodiments, a robotic system 100 may include a robotic limb that may perform operations to provide services to one or more users in different tasks such as cooking, gardening, painting, etc. Robotic limb 102 may include any suitable combination of one or more limb segment 105, joint 110, and end-effector 115. In some embodiments, robotic limb 102 may further include one or more manipulators. As an example and not by way of limitation, this manipulator may include one or more fingers 120, a suction-based gripper, or a jammable-based gripper. In some embodiments, robotic limb 102 may be connected at one end to a fixed surface 130. As an example and not by way of limitation, this fixed surface may include a wall, a ceiling, a cabinet, a workbench, etc. As further depicted by FIG. 1, the robotic system 100 may include an onboard computing system 152 that may be utilized for the operation of the robotic limb 102, in accordance with the presently disclosed embodiments. The onboard computing system may track multiple components of a robotic limb, such as joints, end-effectors, grippers, fingers, etc., and adjusts their pose accordingly until a desired pose is reached. A pose may include either of, or both of, the position in three-dimensional (3D) space and the orientation of the one or more components of the robotic limb.

For example, in some embodiments, the onboard computing system 152 may include, among other things, one or more processor(s) 154, memory 156, sensors 158, one or more motors and actuators 160, a display 162, input structures 164, network interfaces 166, a power source 168, and an input/output (I/O) interface 170. It should be noted that FIG. 1 is merely one example of a particular implementation and is intended to illustrate the types of components that may be present in the robotic system 100. As depicted, the one or more processor(s) 154 may be operably coupled with the memory 156 to perform various algorithms for instructing the robotic limb 102 to perform different operations. Such programs or instructions executed by the processor(s) 154 may be stored in any suitable article of manufacture that includes one or more tangible, computer-readable media at least collectively storing the instructions or routines, such as the memory 156. The memory 156 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 154 to enable the robotic limb 102 to perform various functionalities.

In certain embodiments, the sensors 158 may include, for example, one or more cameras (e.g., depth cameras), touch sensors, microphones, motion detection sensors, thermal detection sensors, light detection sensors, time of flight (ToF) sensors (e.g., LiDAR system), ultrasonic sensors, infrared sensors, or other similar sensors that may be utilized to detect various user inputs (e.g., user voice inputs, user gesture inputs, user touch inputs, user instrument inputs, user motion inputs, and so forth). The motors and actuators 160 may include any number of electronic motors (e.g., DC motors) that may be utilized to drive actuators, which may allow the robotic limb 102 to perform various mechanical operations and/or motional operations (e.g., walking, head and neck motions, limb and joint motions, body motions, dance motions, eye motions, and so forth). The display 162 may include any display architecture (e.g., LCD, OLED, e-Ink, and so forth), which may provide further means by which users may interact and engage with the robotic limb 102.

In certain embodiments, the input structures 164 may include any physical structures utilized to control one or more global functions of the robotic limb 102 (e.g., pressing a button to power "ON" or power "OFF" the robotic limb 102). The network interface 166 may include, for example, any number of network interfaces suitable for allowing the robotic limb 102 to access and receive data over one or more cloud-based networks (e.g., a cloud-based service that may service hundreds or thousands of the robotic limb 102 and the associated users corresponding thereto) and/or distributed networks. The power source 168 may include any suitable source of power, such as a rechargeable lithium polymer (Li-poly) battery and/or an alternating current (AC) power converter that may be utilized to power and/or charge the robotic limb 102 for operation. Similarly, the I/O interface 170 may be provided to allow the robotic limb 102 to interface with various other electronic or computing devices, such as one or more auxiliary electronic devices.

In particular embodiments, the onboard computing system 152 may instruct the robotic limb 102 to achieve a desired pose. The onboard computing system 152 may access sensor data representing a scene from one or more sensors. These sensors may comprise for example and not by way of limitation, one or more three-dimensional (3D) cameras, LIDAR, DVS, or RGB-D cameras. In particular embodiments, the sensor data may comprise image data (such as RGB-D or depth images). In particular embodiments, non-image based data (such as RFID data) may be used instead of, or in conjunction with, the image data. The sensor data may represent a scene that includes a least a portion of the robotic limb 102 that can thus be utilized by the computing device for various functions related to pose of the robotic limb 102. This disclosure contemplates that the one or more sensors can be located on the robotic limb 102 or external to the robotic limb 102, or both. Other sensors for sensing the pose of the robotic limb 102 may be built into the robotic system 100 of which the limb 102 is a part, and may include joint encoders, computation encoders, limit switches, motor current sensors, or any suitable combination thereof.

In particular embodiments, the onboard computing system 152 may isolate at least a portion of the sensor data that represents at least a portion of the robotic limb 102. As an example and not by way of limitation, this may be completed through a point cloud technique. In particular embodiments, the onboard computing system 152 may use 3D depth sensor data to record one or more snapshots of the point cloud of positional data points of the scene. These data points may include information about one or more external surfaces contained in the scene, including the external surfaces of the robotic limb 102, the table surface, and one or more objects contained in the scene. From this, the onboard computing system 152 may isolate a two-dimensional (2D) region that contains at least a portion of one or more objects contained within the scene. From at least a portion of the sensor data, the onboard computing system 152 may create one or more RGB-D clusters of various objects in the scene. In particular embodiments, the one or more RGB-D clusters of various objects includes the robotic limb 102 contained within the scene.

In particular embodiments, the scene may contain one or more objects that are further isolated by the onboard computing system 152. Upon isolating the one or more objects in the scene, the onboard computing system 152 may classify the one or more RGB-D clusters of various objects in the scene created from the portion of the sensor data. This classification may be conducted by the onboard computing system 152 via any method of classification, including for example and not by way of limitation manual identification by a user or any method of artificial intelligence, including computer vision, machine learning, neural networks, or deep learning. Variations of neural networks utilized for classification may include, for example and not by way of limitation, three-dimensional segmentation networks (3DSNs) such as three-dimensional convolutional neural networks (3DCNNs), Deep Kd-networks, regional convolutional neural networks (RCNNs), or recurrent neural networks (RNNs). In particular embodiments, this classification may determine that at least one of the one or more objects within a scene is a robotic limb 102. In particular embodiments, the onboard computing system 152 may additionally classify other objects contained within a scene, including for example but not by way of limitation, a coffee mug, a bottle, a vase, a spoon, a plate, a screwdriver, a light bulb, a hand or arm, etc.

While the present embodiments may be discussed below primarily with respect to a robotic limb, it should be appreciated that the present techniques may be applied to any of various robotic devices that may perform various operations to provide services to users. In particular embodiments, the robotic device may comprise any electronic device or computing device that may be configured with computer-based intelligence (e.g., machine learning [ML], artificial intelligence [AI], deep learning, cognitive computing, artificial neural networks [ANN], and so forth), which may be utilized by the robotic device to perform operations to provide services to users through, for example, motions, actions, gestures, body movements, facial expressions, limb and joint motions, display changes, lighting, sounds, and so forth. For example, in one embodiment, a robotic device may include a robot, a robotic limb, or similar AI or cognitive computing device that may be provided to contextually interact, instruct, operate, and engage with (e.g., in real-time or near real-time), for example, humans, pets, other robotic electronic devices, one or more servers, one or more cloud-based services, home appliances, electronic devices, automobiles, and so forth. Furthermore, as used herein, a robotic device may refer to any autonomous or semi-autonomous computing device capable of performing one or more mechanical and/or electromechanical motions or movements (e.g., human-like motions and movements) in response to, for example, one or more user inputs, one or more user commands (e.g., voice commands, gesture commands), one or more triggers (e.g., a time trigger, a keyword trigger, a tonal trigger, a user emotional response trigger, user motional trigger, a location trigger, an environmental trigger), and so forth.

Robot-Adapted Cutting Board and Knife

In particular embodiments, the disclosed technology includes a system for implementing a robot-adapted cutting board and knife which allows for cutting objects on the cutting board with a robotic limb 102. In particular, the system may be adapted to allow the robot with a single robotic limb 102 to cut objects on the cutting board without any other stabilizing actions by the robot. The disclosed technology includes a cutting board and knife that is suitable for use by any type of robotic system with limbs or other suitable means capable of gripping a knife. Robotic systems have gotten increasingly complex as they are utilized for various technological fields. Such technological fields include performing humanlike activities, such as, but not limited to, cutting objects on a cutting board. Additionally, there may be a need to reduce the size of robotic systems for home/personal use. This may be to implement the robotic system in a different manner. Furthermore, there may be a need to reduce the cost of the robotic system or accommodate other engineering and development constraints unique to the system. However, as the size and costs of a robotic system are reduced, different components internal and external to the robot may be needed to aid the robot in carrying out its designated tasks. As an example and not by way of limitation, a knife may need to be designed in a way so that the single robotic limb 102 may securely connect to the knife in sufficiently strong and stable manner. Also, as an example and not by way of limitation, a system may need to be designed to help stabilize and simplify the movements required for the robot to cut the object on the cutting board. Although this disclosure describes implementing a robot-adapted cutting board and knife in a particular manner, this disclosure contemplates implementing a robot-adapted cutting board and knife in any suitable manner.

Certain technical challenges exist for implementing a robot-adapted cutting board and knife. One technical challenge may include designing a knife so that a single robotic limb 102, which may have limited manipulators or fingers, may securely connect to the knife. The solution presented by the embodiments disclosed herein to address this challenge may be to design the handle of the knife with one or more chambers configured to intercouple with the one or more robotic fingers 120. Another technical challenge may include keeping the knife stable and simplifying the motion needed for a single robotic limb 102 to push down on a knife to cut the object without needing a second robotic limb 102 to aid the cutting process. The solution presented by the embodiments disclosed herein to address this challenge may be to design a knife with an indentation at a distal end of the blade, wherein the indentation is configured to intercouple with a bar attached to the cutting board. In doing so, the knife may be stabilized at the distal end and the robot may have an easier time cutting the object because the robotic limb may simply provide a downward force to the handle portion of the knife to push a blade portion of the knife towards a cutting surface. Another technical challenge may include keeping the object on the cutting board stable while the single robotic limb 102 cuts the object. The solution presented by the embodiments disclosed herein to address this challenge may be to design a weighted arm connected to the bar that holds the object to be cut down on the cutting board.

Certain embodiments disclosed herein may provide one or more technical advantages. A technical advantage of the embodiments may include implementing a knife handle design wherein the robotic limb 102 with limited manipulators or fingers 120 may securely intercouple with the knife handle. Another technical advantage of the embodiments may include simplifying the motion and reducing the force needed for the robotic limb 102, which may have limited range of motion and strength, to push a knife to cut an object. Certain embodiments disclosed herein may provide none, some, or all of the above technical advantages. One or more other technical advantages may be readily apparent to one skilled in the art in view of the figures, descriptions, and claims of the present disclosure.

In particular embodiments, the robotic limb 102 may intercouple with a handle of a knife, wherein the knife is designed to intercouple with a bar affixed to a cutting surface, the bar being disposed along a first axis. As an example and not by way of limitation, the knife may comprise the handle at a proximal end, wherein the handle is configured to intercouple with the robotic limb 102. The knife may also comprise a blade connected to the handle and an indentation at a distal end, wherein the indentation is configured to intercouple along a second axis with the bar of the cutting surface, wherein the second axis is substantially perpendicular to the first axis, and the blade is rotatable around the first axis while intercoupled with the bar. The knife described may be of various sizes, lengths and designs. In particular embodiments, the bar is affixed to the cutting surface at a specified height above the cutting surface, wherein a width of the blade is at least as wide as the specified height. Thus, the width of the blade of the knife is wide enough such that when the knife is intercoupled with the bar, the specified height of the bar is a height that allows the cutting edge of the knife to be substantially flush with the cutting surface once the knife is finished cutting. If the bar is too high, then the cutting edge will not reach the cutting surface, and if the bar it too low, then the knife will not be able to rotate around the bar to cut the object. In particular embodiments, the robotic limb 102 may comprise one or more robotic fingers 120 wherein one or more of the robotic fingers 120 intercouple with one or more chambers of the handle when intercoupling the robotic limb to the handle of the knife. In particular embodiments, the blade may further comprise of a cutting edge wherein the cutting edge is used to cut the object when rotating the knife around the first axis toward the cutting surface. In particular embodiments, when the indentation of the blade is intercoupled with the bar of the cutting board and the knife is rotated around the first axis to be in contact with the cutting board, the cutting edge is configured to be substantially flush with the cutting surface to finish cutting the object. In particular embodiments, the indentation is located on a spine of the blade. In particular embodiments, the indentation is located on a tip of the blade. In particular embodiments, the blade further comprises a plurality of holes in a particular pattern, wherein the particular pattern is configured to reduce a contact area between the blade and the object being cut by the blade, and wherein the plurality of holes causes the object to not stick to the blade once finished cutting the object. Although this disclosure describes the robotic limb 102 intercoupled to the handle of the knife designed to intercouple with the bar affixed to the cutting surface in a particular manner, this disclosure contemplates the robotic limb 102 intercoupled to the handle of the knife designed to intercouple with the bar affixed to the cutting surface in any suitable manner.

In particular embodiments, the robotic limb 102 may cause the indentation of the knife to be intercoupled with the bar of a cutting board, wherein the cutting board comprises the cutting surface and the bar which may be affixed to the cutting surface, wherein the bar is disposed along the first axis. As an example an example and not by way of limitation, the robotic limb 102 may cause the indentation of the knife to be intercoupled in any location along the bar of the cutting board. The cutting board may be of various shapes or dimensions and comprised of various materials. In particular embodiments, the bar of the cutting board may attach to the cutting surface through a connection to a connector object wherein the connector is a specified height above the cutting surface, wherein a width of the blade is at least as wide as the specified height. In particular embodiments, the bar of the cutting board may directly attach to the cutting surface through a curved portion of the bar wherein the curved portion of the bar is of sufficient height such that the portion of the bar disposed along a first axis is at a specified height above the cutting surface wherein the width of the blade is at least as wide as the specified height. Although this disclosure describes the robotic limb 102 causing the indentation of the knife to be intercoupled with the bar of a cutting board in a particular manner, this disclosure contemplates the robotic limb 102 causing the indentation of the knife to be intercoupled with the bar of a cutting board in a particular manner in any suitable manner.

In particular embodiments, the robotic limb 102 may adjust a position of the knife along the bar to align with an object on the cutting surface. In particular embodiments, the robotic limb 102 may adjust the position of the knife while the indentation of the knife is intercoupled to the bar. In another embodiment, the robotic limb may adjust the position of the knife when the knife is not intercoupled to the bar. As an example and not by way of limitation, the object on the cutting surface may be a fruit, vegetable, other types of food, or any other suitable object to be cut. In particular embodiments, the robotic limb 102 places the object on the cutting surface. In a particular embodiment, the robotic limb 102 places a weighted arm on the object, wherein the weighted arm holds the object to the cutting surface, wherein the weighted arm is attachable to the bar and is rotatable around the first axis and slidable along the bar on the first axis. The weighted arm may be comprised of various materials, size and shape. Also, the weighted arm may have a specially designed surface that contacts the object wherein the surface has a certain design, texture or material that may help it hold onto the object on the cutting surface. Furthermore, the weighted arm may be designed such that it may be attached and removed from the bar. In particular embodiments, the robotic limb 102 may rotate the knife around the first axis toward the cutting surface to cut the object on the cutting surface. Although this disclosure describes adjusting the position of the knife along the bar to align with an object on the cutting surface and rotating the knife around the first axis toward the cutting surface to cut the object on the cutting surface by the robotic limb 102 in a particular manner, this disclosure contemplates adjusting the position of the knife along the bar to align with an object on the cutting surface and rotating the knife around the first axis toward the cutting surface to cut the object on the cutting surface by the robotic limb 102 in any suitable manner.

In particular embodiments, the robotic limb 102 may slide a pair of grommets affixed to the bar to align with the object on the cutting surface, wherein the pair of grommets are slidable along the bar on the first axis, wherein the indentation of the blade intercouples with the bar between the pair of grommets, wherein the pair of grommets stabilize movement of the blade along the first axis while the knife is rotating around the bar to cut the object. Although this disclosure describes a robotic limb 102 sliding a pair of grommets affixed to the bar in a particular manner, this disclosure contemplates a robotic limb 102 sliding a pair of grommets affixed to the bar in any suitable manner.

Figure 2:
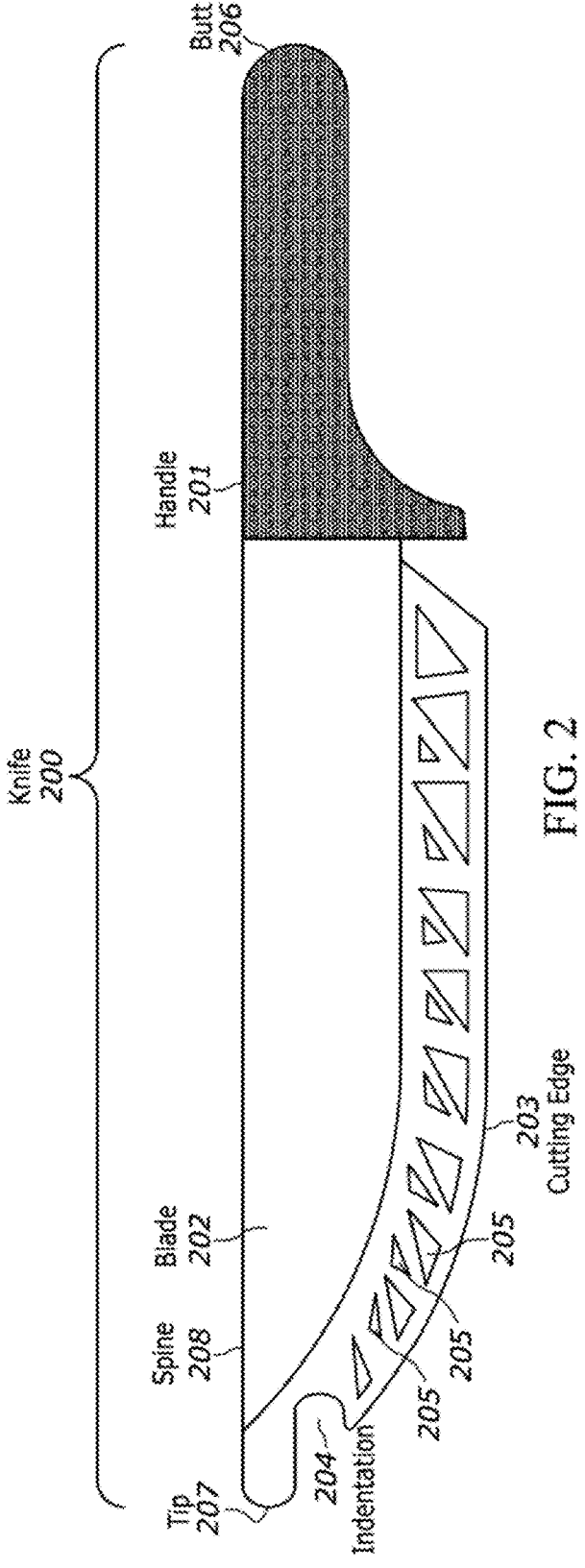
FIG. 2 illustrates an example diagram of a knife and its components.

FIG. 2 illustrates an example diagram of a knife 200 and its components. In particular embodiments, the knife 200 may comprise a butt 206 and a tip 207 at two opposite ends. The knife may further comprise a handle 201, a blade 202, a cutting edge 203, a spine 208, an indentation 204 and holes 205 cut into the blade 202. While a certain number of components of the knife 200 is shown and in a particular arrangement, this disclosure contemplates a knife 200 with any number of components arranged in any suitable manner. In particular embodiments, the knife may comprise the handle 201 at a proximal end and the blade 202 connected to the handle 201. As an example and not by way of limitation, in particular embodiments the indentation 204 may be located at the tip 207 of the blade 202, but in particular embodiments the indentation 204 may be located on the spine 208 of the blade 202. As an example and not by way of limitation, in particular embodiments there may be a plurality of holes 205 in the blade 202 in particular pattern configured reduce a contact area between the blade and the object being cut by the blade, and where the plurality of holes causes the object to not stick to the blade once finished cutting the object.

Figures 3A, 3B, 3C:
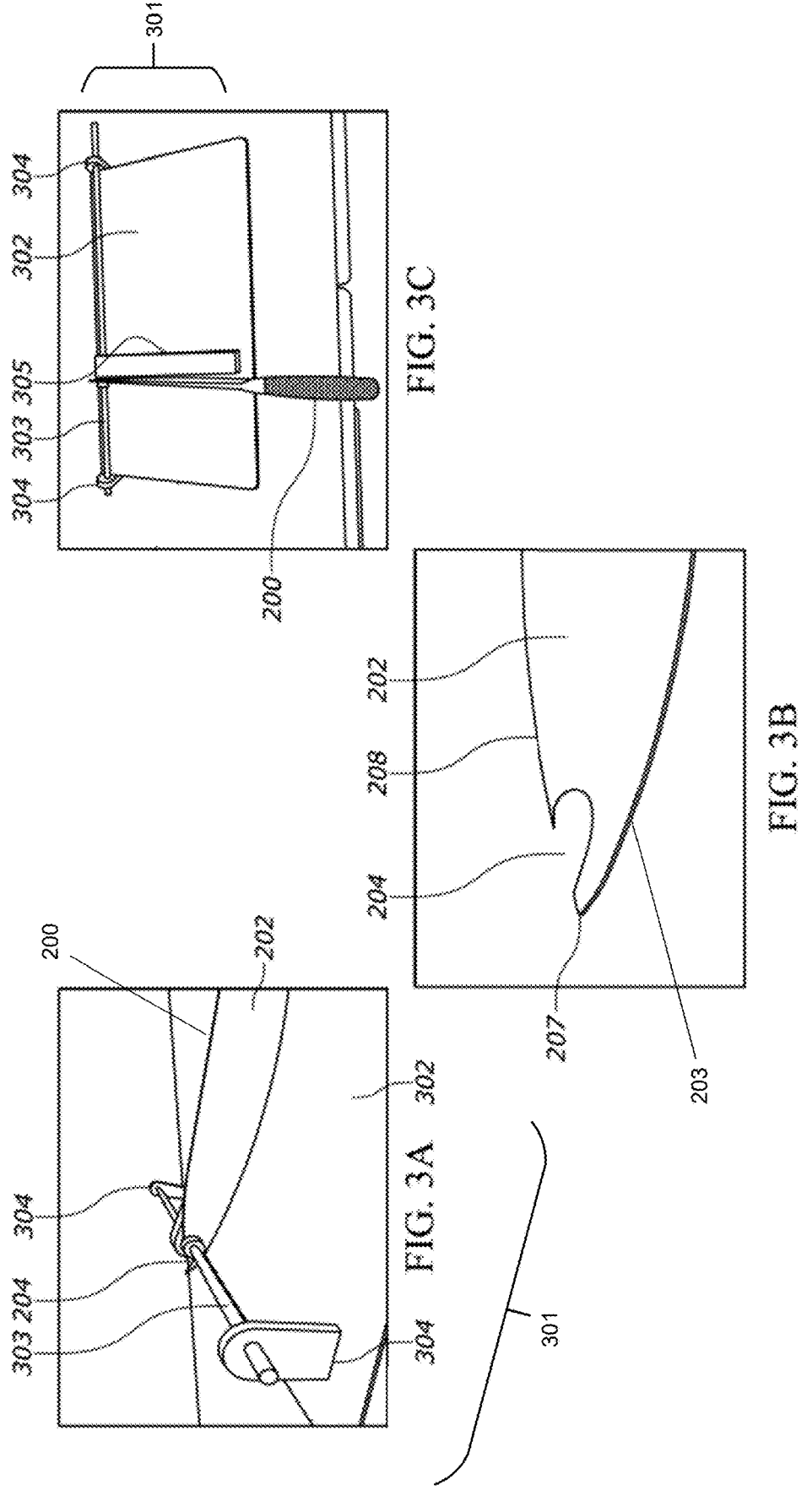
FIGS. 3A-3C illustrate an example cutting board and knife.

FIGS. 3A-3C illustrate an example cutting board 301 and knife 200. FIG. 3A illustrates a knife 200 intercoupled to the bar 303 and resting on the cutting surface 302. In particular embodiments, the apparatus may comprise of a knife 200 with an indentation 204 in its blade 202, a cutting board 301 a cutting surface 302, a bar 303 with attachment points 304 to the cutting surface 302. In particular embodiments, the cutting board 301 comprises a cutting surface 302 and the bar 303 affixed to the cutting surface 302 wherein the bar is disposed along the first axis. In particular embodiments, the knife may comprise an indentation 204 at the distal end, wherein the indentation 204 is configured to intercouple along a second axis with the bar 303 of the cutting surface 302, wherein the second axis is substantially perpendicular to the first axis, and wherein the blade 202 is rotatable around the first axis while intercoupled with the bar 303. In particular embodiments, the bar 303 is affixed to the cutting surface 302 at a specified height above the cutting surface 302, wherein a width of the blade 202 is at least as wide as the specified height. As an example and not by way of limitation, the bar 303 may be affixed to the cutting surface 302 of the cutting board 301 at attachment points 304. FIG. 3B illustrates an indentation 204 in the blade 202 of the knife 200. FIG. 3C illustrates an overhead view of the knife 200 and the cutting board 301. In particular embodiments, the cutting board 301 may further comprise a weighted arm 305 connected to the bar 303 and extending along the second axis substantially perpendicular to the bar 303, wherein the weighted arm 305 is rotatable around the first axis and slidable along the bar 303 on the first axis. In particular embodiments, the weighted arm 303 may rest on the cutting surface 302. In particular embodiments, the knife 200 may stand upright while resting on its cutting edge 203 contacting the cutting surface 302 while the indentation 204 is intercoupled with the bar 303. Having the knife 200 stand upright while resting on the cutting surface 302 may put the handle 201 of the knife 200 in an orientation which makes it easy for the robotic limb 102 to intercouple with the handle 201 of the knife 200.

Figure 4:
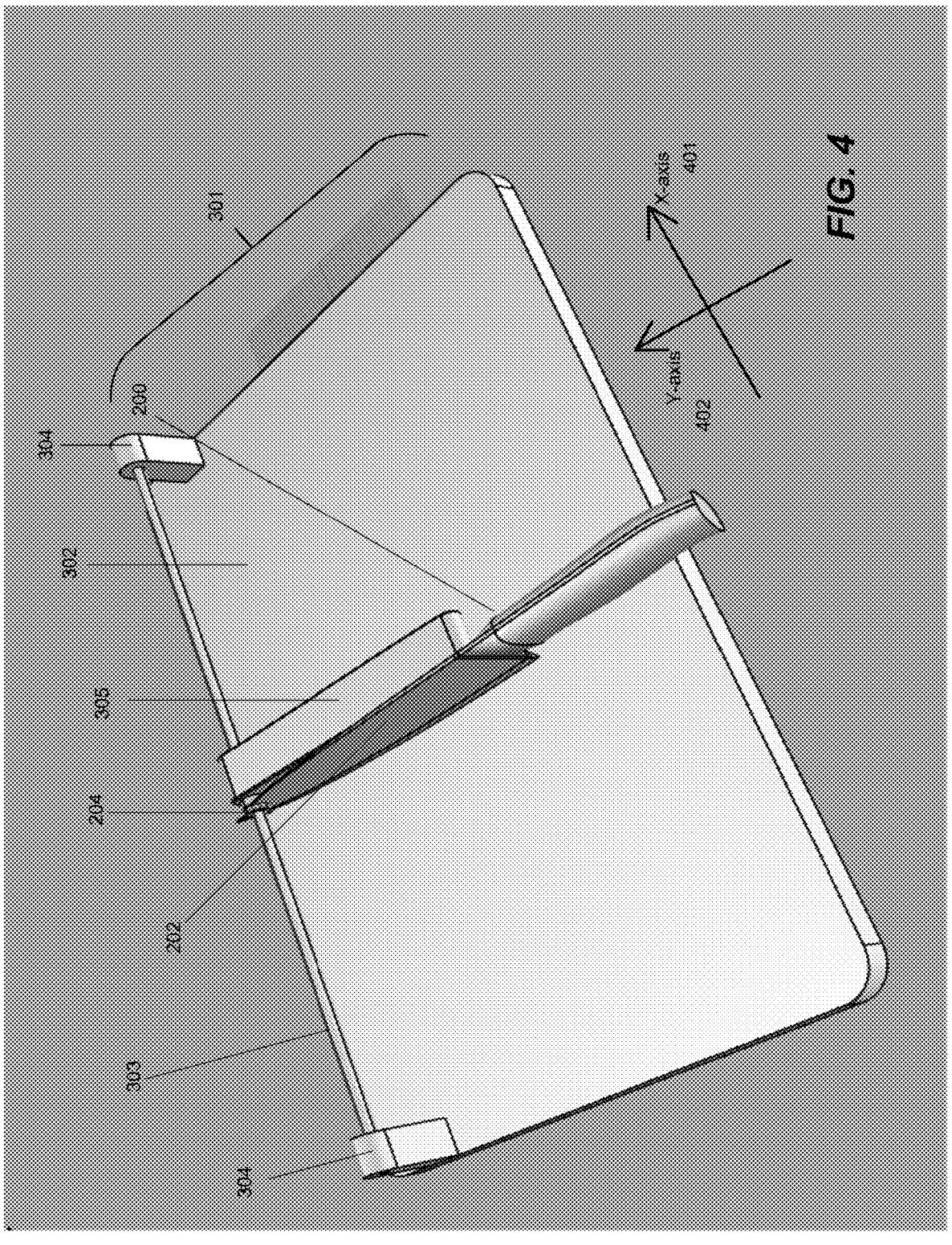
FIG. 4 illustrates a perspective view of an example cutting board and knife.

FIG. 4 illustrates a perspective view of an example cutting board 301 and knife 200. Similarly to the cutting board and knife shown in FIGS. 3A-3C, the knife 200 and cutting board 301 illustrated in FIG. 4 may comprise similar components. FIG. 4 also illustrates X-axis 401 and a Y-axis 402 planes. In particular embodiments, the first axis substantially aligns with the X-axis 401 and the second axis substantially aligns with the Y-axis 402. As an example and not by way of limitation, the bar 303, which is affixed to the cutting surface 302, may be disposed along the first axis. As another example and not by way of limitation, the knife 200 may comprise an indentation 204 at the distal end, wherein the indentation 204 is configured to intercouple along the second axis with the bar 303 of the cutting surface 302, wherein the second axis is substantially perpendicular to the first axis, and wherein the blade 202 is rotatable around the first axis while intercoupled with the bar 303. In particular embodiments, the robotic limb 102 may rotate the knife 200 around the first axis toward the cutting surface 302 to cut the object on the cutting surface 302.

Figure 5A:
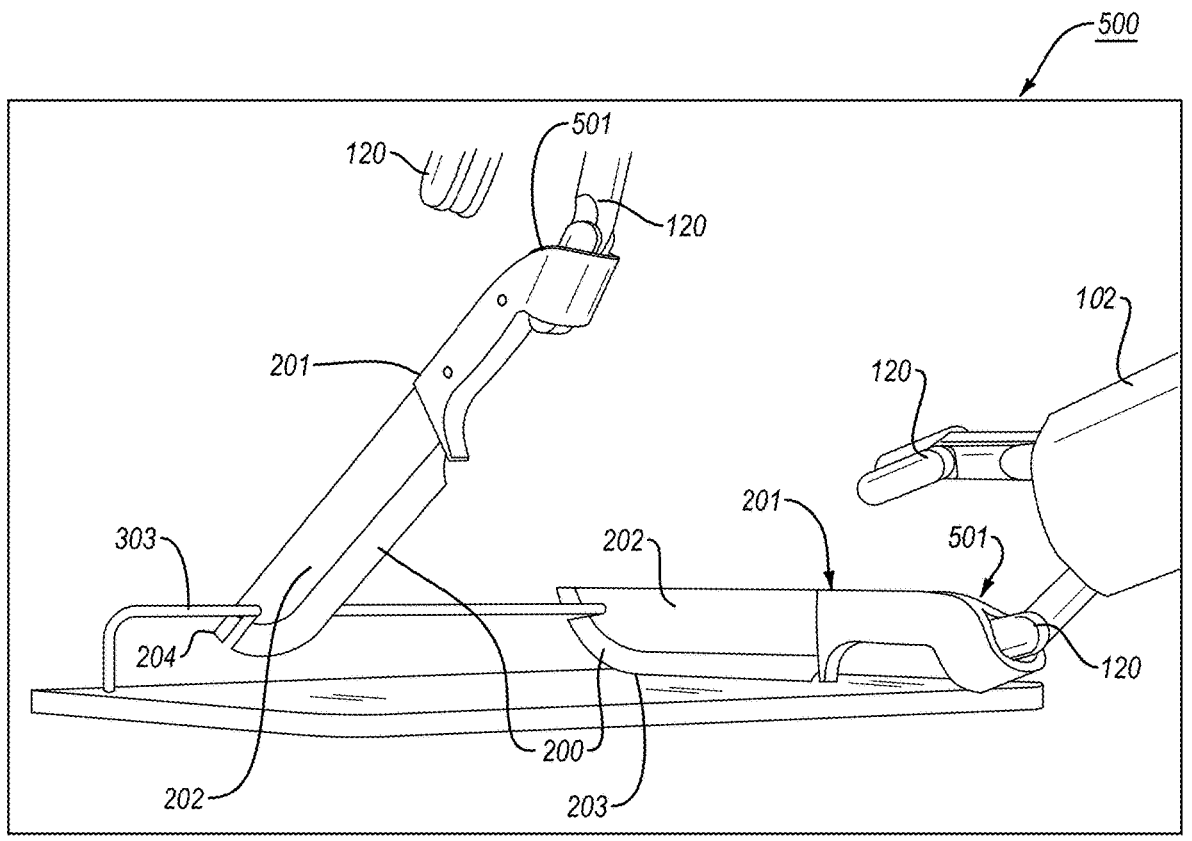
FIGS. 5A-5C illustrate an example apparatus.
Figure 5B:
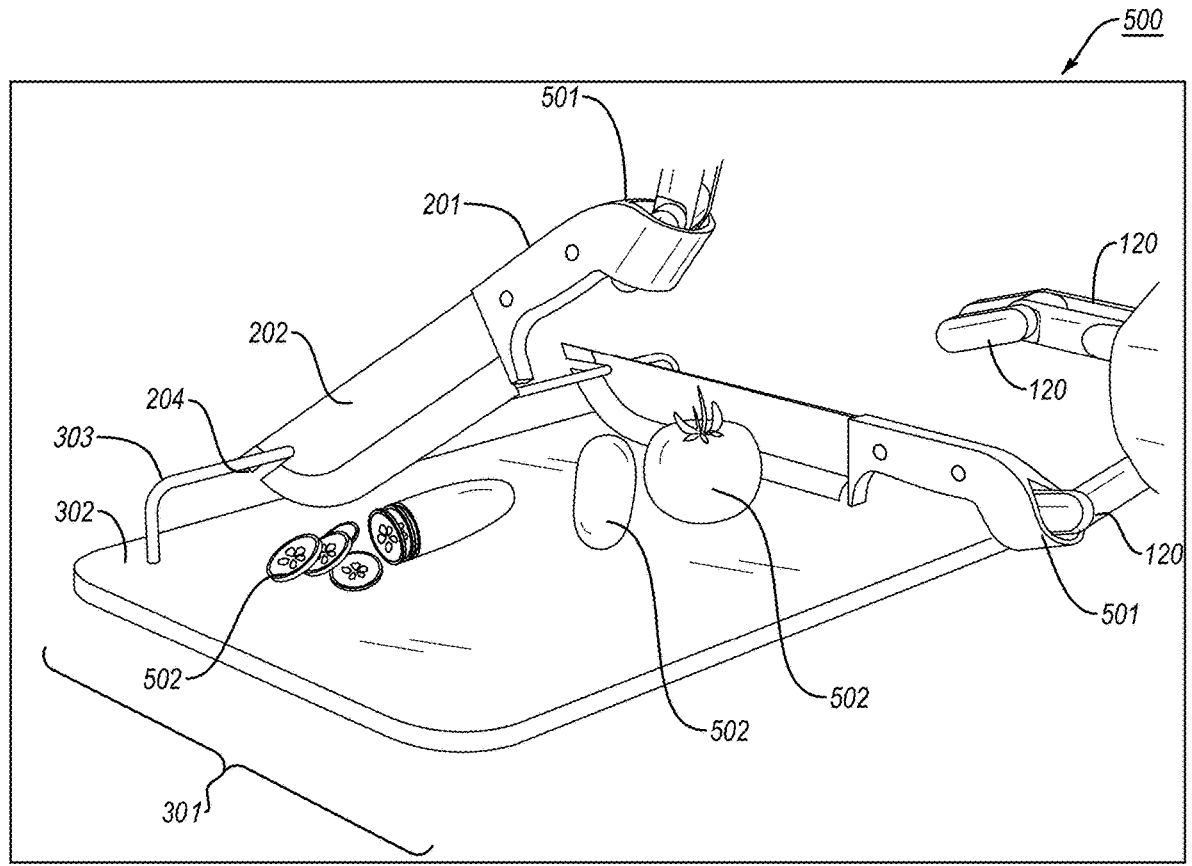
Figure 5C:
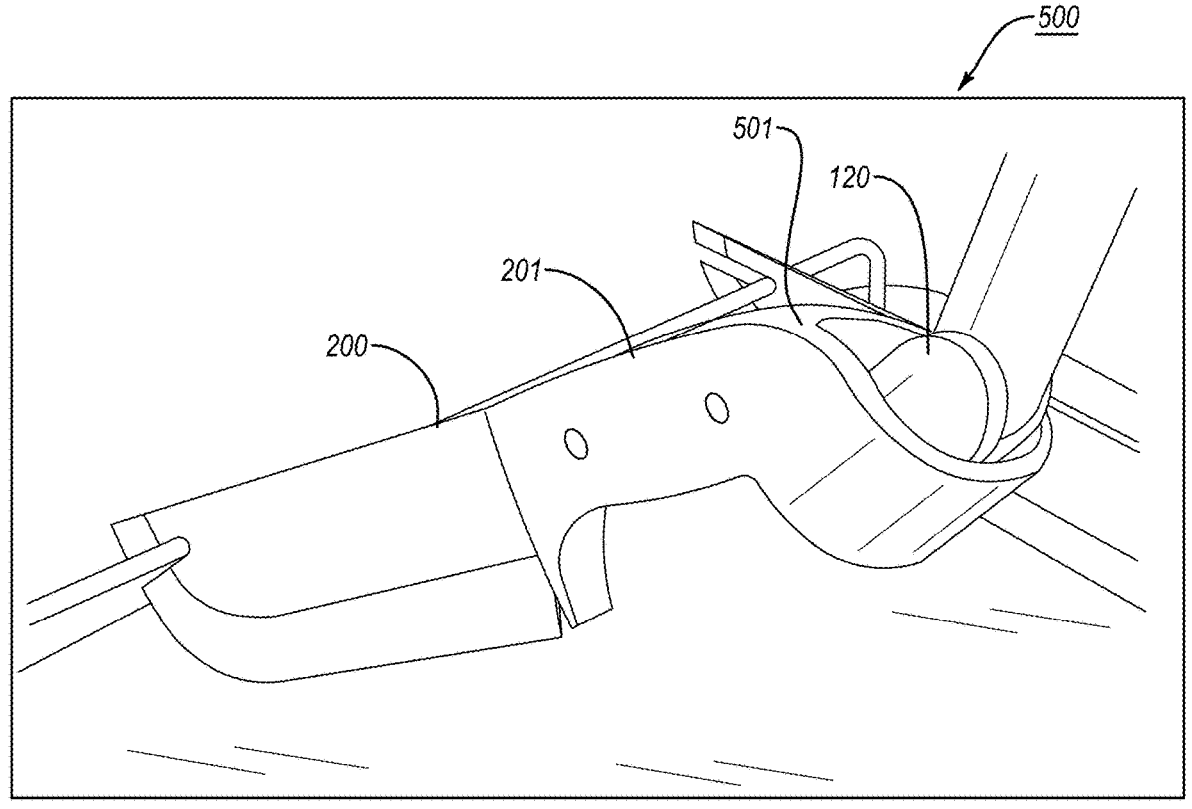

FIGS. 5A-5C illustrate an example apparatus 500. The example apparatus 500 may comprise the knife 200, cutting board 301 and the robotic limb 102. The handle 201 portion of the knife 200 may comprise one or more chambers 501 designed to allow the robotic limb 102 to intercouple with the knife 200. FIG. 5A illustrates the robotic limb 102 intercoupled with the handle 201 of the knife 200. The one or more chambers 501 may be located at the butt 206 of the handle 201. In particular embodiments, the robotic limb 102 may comprise the one or more robotic fingers 120, wherein the one or more of the robotic fingers 120 intercouple with the one or more chambers 501 of the handle 201 when intercoupling the robotic limb to the handle of the knife. In particular embodiments, the robotic limb 102 causes the indentation 204 of the knife 200 to be intercoupled with the bar 303 of a cutting board 301. In particular embodiments, the blade 202 further comprises the cutting edge 203 wherein, when the indentation 204 of the blade is intercoupled with the bar 303 of the cutting board 301 and the knife 200 is rotated around the first axis to be in contact with the cutting board 301, the cutting edge 203 is configured to be substantially flush with the cutting surface 302 to finish cutting the object. FIG. 5B illustrates an example apparatus 500 which may include the object 502 on the cutting surface 302. As an example and not by way of limitation, there may be one or more objects on the cutting surface 302. In particular embodiments, the robotic limb 102 may place the object 501 on the cutting surface 302. In particular embodiments, the robotic limb 102 may adjust the position of the knife 200 along the bar 303 to align with the object 502 on the cutting surface. As an example and not by way of limitation, the bar 303 may be affixed to the cutting surface 302 by directly attaching to the cutting surface 302 by being embedded in the cutting board 301. In particular embodiments, the robotic limb 102 rotates, the knife 200 around the first axis toward the cutting surface 302 to cut the object 502 on the cutting surface 302. FIG. 5C illustrates an example apparatus 500 with a close up view of the one or fingers 120 of the robotic limb 102 intercoupled with the one or more chambers 501 of the handle 201 of the knife 200.

Figure 6B:
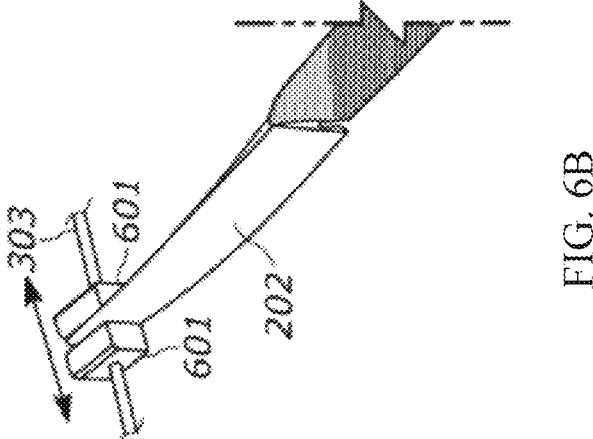
FIGS. 6A-6D illustrate an example apparatus.
Figure 6A:
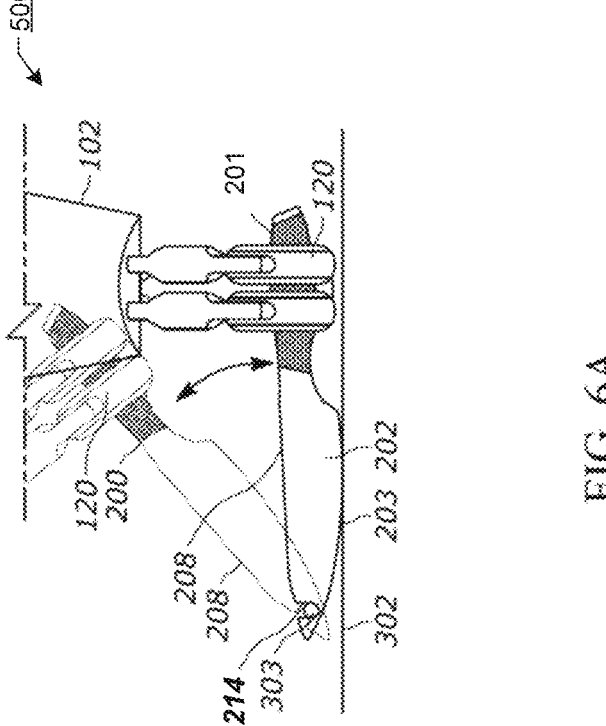
Figure 6D:
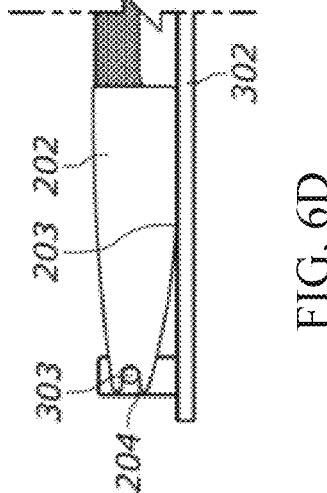
Figure 6C:
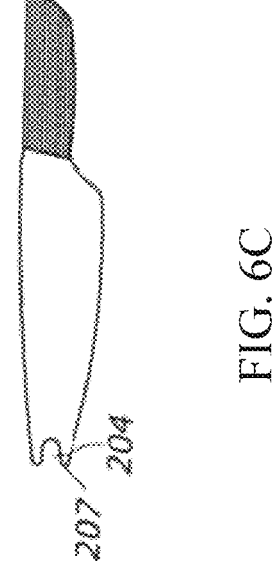

FIGS. 6A-6D illustrate an example apparatus 500. The example apparatus 500 may comprise of similar components as the apparatus 500 illustrated in FIGS. 5A-5C. The apparatus 500 may further comprise a pair of grommets 601 affixed to the bar 303, as illustrated in FIG. 6B. FIG. 6A illustrates an example robotic limb 102 intercoupled to the handle 202 of the knife 200 and rotating the knife 200 around the first axis toward the cutting surface 302. FIGS. 6A-6D also illustrates examples of different knives 200 with different designs. In particular embodiments, the knife may comprise the indentation at the distal end, wherein the indentation is configured to intercouple along the second axis with the bar 303 of the cutting surface 302. In particular embodiments, the indentation 214 may located on the spine 208 of the blade 202, as illustrated in the example of FIG. 6A. In another embodiment, the indentation 204 may be located on the tip 207 of the blade 202, as illustrated in the example of FIGS. 6C and 6D. FIG. 6B illustrates example knife 200 of apparatus 500 with a pair of grommets 601 affixed to the bar 303. In particular embodiments, the robotic limb 102 may slide the pair of grommets 601 affixed to the bar 303 to align with the object 502 on the cutting surface 302, wherein the pair of grommets 601 are slidable along the bar 303 on the first axis, wherein the indentation 204 of the blade 202 intercouples with the bar 303 between the pair of grommets 601, wherein the pair of grommets 601 stabilize movement of the blade 202 along the first axis while the knife 20 is rotating around the bar 303 to cut the object 502.

Figure 7:
FIG. 7 illustrates an example force diagram of an example apparatus.

FIG. 7 illustrates an example force diagram of an example apparatus 500. The example apparatus 500 may comprise of similar components as the example apparatuses illustrated in FIGS. 5A-5C and FIGS. 6A-6D. FIG. 7 also illustrates a robot force 701, an object force 702, and a bar force 703. In particular embodiments, the robotic limb 102 may exert the robot force 701 by pushing downward on the handle 201 of the knife 200. The robot force 201 may be substantially downward in direction and exerted by the robotic limb 102 which may cause the knife 200 to rotate around the first axis toward the cutting surface 302 to cut the object 502 on the cutting surface 302. In particular embodiments, the object force 702 may result from the object 502 exerting a substantially upward force against the blade 202 of the knife 200 when the blade 202 of the knife 200 cuts the object 502. In particular embodiments, the bar force 703 may result from the bar 303 applying a substantially downward force to the tip 207 portion of the knife 200 which counteracts the object force 502 and allows the knife 200 to remain stable while the robotic limb 102 rotates the knife 200 around the first axis toward the cutting surface 302 to cut the object 502 on the cutting surface 302. In particular embodiments, the bar force 703 may counteract the object force 702 and stabilize the knife 200 to allow a single robotic limb 102 to cut the object 502 on the cutting surface 302.

FIGS. 8A-8C illustrate example blades 202 comprising a plurality of holes 205. FIGS. 8A, 8B, and 8C each illustrate a different example of a particular pattern of holes 205 in the blade 202. In particular embodiments, the holes 205 may optionally be included on the blade 202, wherein the hole will decrease the surface area of the blade 202. In particular embodiments, the blade 202 may comprise a plurality of holes 205 in a particular pattern, wherein the particular pattern is configured to reduce a contact area between the blade 202 and an object 502 being cut by the blade 202. In particular embodiments, the plurality of holes 205 reduces the amount of adhesion (i.e., "sticking") between the blade 202 and the object 502 while it is being cut. Different patterns may be used to improve the "non-stickiness" of the blade 202. Although this disclosure describes and illustrates blades 202 having particular patterns of holes 205, this disclosure contemplates blades 202 having any suitable pattern of holes 205 or no holes 205.

FIG. 9 illustrates is a flow diagram of a method 900 for implementing a robot-adapted cutting board 301 and knife 200, in accordance with the presently disclosed embodiments. The method 900 may be performed utilizing one or more processing devices (e.g., the robotic system 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/ executing on one or more processors), firmware (e.g., microcode), or some combination thereof.

The method 900 may begin at step 910 with the one or more processing devices (e.g., the robotic system 100) causing the robotic limb 102 to intercouple with the handle 201 of the knife 200, wherein the knife 200 is designed to intercouple with the bar 303 affixed to the cutting surface 302, the bar 303 being disposed along a first axis. For example, in particular embodiments, the knife 200 may comprise the handle 201 at the proximal end wherein the handle 201 is configured to intercouple with the robotic limb 102, the blade 202 connected to the handle 201, and the indentation 204 at the distal end, wherein the indentation 204 is configured to intercouple along the second axis with the bar 303 of the cutting surface 302, wherein the second axis is substantially perpendicular to the first axis, and wherein the blade 202 is rotatable around the first axis while intercoupled with the bar 303. The method 900 may then continue at step 920 with the one or more processing devices (e.g., the robotic system 100) causing the robotic limb 102 to intercouple the indentation 204 of the knife 200 with the bar 303 of the cutting board 301. For example, in particular embodiments, the cutting board 301 may comprise the cutting surface 302 and the bar 303 affixed to the cutting surface 302, wherein the bar 303 is disposed along the first axis. The method 900 may then continue at step 930 with the one or more processing devices (e.g., the robotic system 100) causing the robotic limb 102 to adjust the position of the knife 200 along the bar 303 to align with the object 502 on the cutting surface 302. The method 900 may then continue at step 940 with the one or more processing devices (e.g., the robotic system 100) causing the robotic limb 102 to rotate the knife 200 around the first axis toward the cutting surface 302 to cut the object 502 on the cutting surface 302. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for implementing a robot-adapted cutting board and knife including the particular steps of the method of FIG. 9, this disclosure contemplates any suitable method for implementing a robot-adapted cutting board and knife including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Systems and Methods

Figure 10:
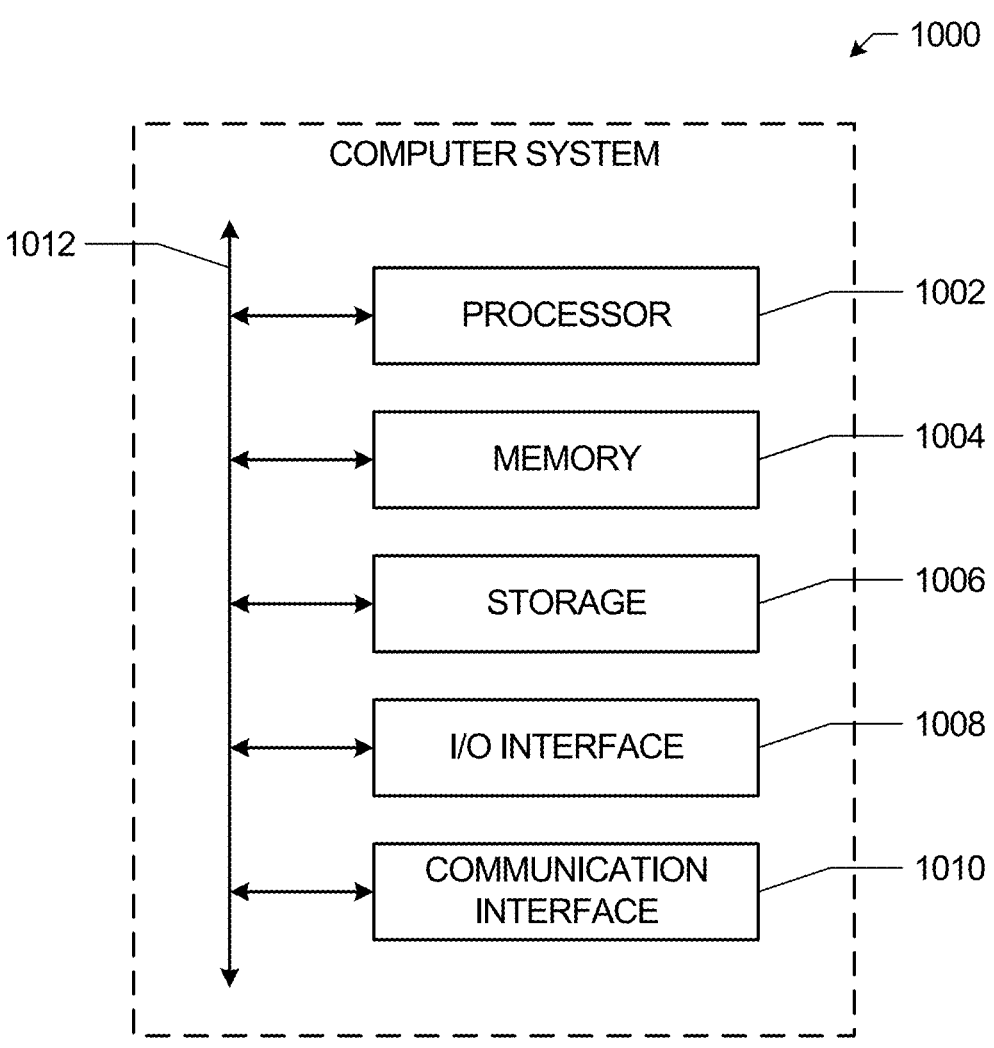
FIG. 10 illustrates an example computer system.

FIG. 10 illustrates an example computer system 1000 that may be utilized to perform implementing a robot-adapted cutting board and knife, in accordance with the presently disclosed embodiments. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks.

Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement. In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002.

Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere).

One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memory devices 1004, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1006 for them. Where appropriate, I/O interface 1008 may include one or more device or software drivers enabling processor 1002 to drive one or more of these I/O devices. I/O interface 1008 may include one or more I/O interfaces 1006, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it.

As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

AI Architecture

Figure 11:
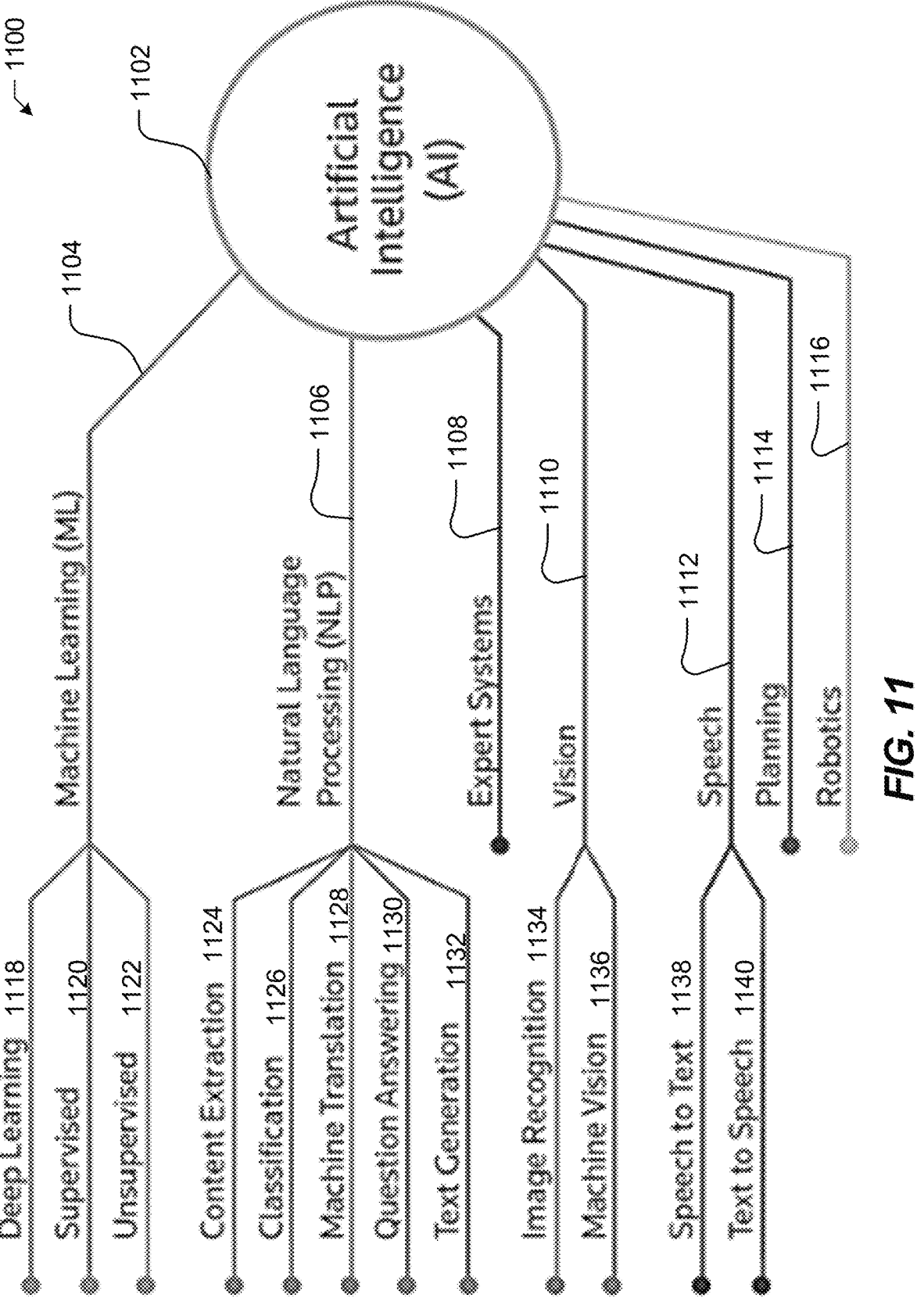
FIG. 11 illustrates a diagram of an example artificial intelligence (AI) architecture.

FIG. 11 illustrates a diagram 1100 of an example artificial intelligence (AI) architecture 1102 that may be utilized to perform implementing a robot-adapted cutting board and knife, in accordance with the presently disclosed embodiments. In particular embodiments, the AI architecture 1102 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 11, the AI architecture 1102 may include machine leaning (ML) algorithms and functions 1104, natural language processing (NLP) algorithms and functions 1106, expert systems 1108, computer-based vision algorithms and functions 1110, speech recognition algorithms and functions 1112, planning algorithms and functions 1114, and robotics algorithms and functions 1116. In particular embodiments, the ML algorithms and functions 1104 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1104 may include deep learning algorithms 1118, supervised learning algorithms 1120, and unsupervised learning algorithms 1122.

In particular embodiments, the deep learning algorithms 1118 may include any artificial neural networks (ANNs) that may be utilized to learn deep levels of representations and abstractions from large amounts of data. For example, the deep learning algorithms 1118 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1120 may include any algorithms that may be utilized to apply, for example, what has been learned in the past to new data using labeled examples for predicting future events. For example, starting from the analysis of a known training dataset, the supervised learning algorithms 1120 may produce an inferred function to make predictions about the output values. The supervised learning algorithms 1120 can also compare its output with the correct and intended output and find errors in order to modify the supervised learning algorithms 1120 accordingly. On the other hand, the unsupervised learning algorithms 1122 may include any algorithms that may applied, for example, when the data used to train the unsupervised learning algorithms 1122 are neither classified or labeled. For example, the unsupervised learning algorithms 1122 may study and analyze how systems may infer a function to describe a hidden structure from unlabeled data.

In particular embodiments, the NLP algorithms and functions 1106 may include any algorithms or functions that may be suitable for automatically manipulating natural language, such as speech and/or text. For example, in particular embodiments, the NLP algorithms and functions 1106 may include content extraction algorithms or functions 1124, classification algorithms or functions 1126, machine translation algorithms or functions 1128, question answering (QA) algorithms or functions 1130, and text generation algorithms or functions 1132. In particular embodiments, the content extraction algorithms or functions 1124 may include a means for extracting text or images from electronic documents (e.g., webpages, text editor documents, and so forth) to be utilized, for example, in other applications.

In particular embodiments, the classification algorithms or functions 1126 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1128 may include any algorithms or functions that may be suitable for automatically converting source text in one language, for example, into text in another language. The QA algorithms or functions 1130 may include any algorithms or functions that may be suitable for automatically answering questions posed by humans in, for example, a natural language, such as that performed by voice-controlled personal assistant devices. The text generation algorithms or functions 1132 may include any algorithms or functions that may be suitable for automatically generating natural language texts.

In particular embodiments, the expert systems 1108 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1110 may include any algorithms or functions that may be suitable for automatically extracting information from images (e.g., photo images, video images). For example, the computer-based vision algorithms and functions 1110 may include image recognition algorithms 1134 and machine vision algorithms 1136. The image recognition algorithms 1134 may include any algorithms that may be suitable for automatically identifying and/or classifying objects, places, people, and so forth that may be included in, for example, one or more image frames or other displayed data. The machine vision algorithms 1136 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1112 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1138 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1140 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus comprising:
a cutting board, a knife intercoupled to the cutting board, and a robotic limb;
wherein the cutting board comprises:
  a cutting surface; and
  a bar affixed to the cutting surface, wherein the bar is disposed along a first axis and couples the knife to the cutting board;
wherein the knife comprises:
  a handle at a proximal end of the knife, wherein a proximal end of the handle is opposite a distal end of the handle that is connected to a blade, and wherein the proximal end of the handle comprises one or more chambers configured to intercouple with the robotic limb, at least one of the one or more chambers having an opening with a central longitudinal axis that is angled relative to a second axis, wherein (1) the second axis is substantially perpendicular to the first axis along the knife, (2) the second axis and the opening central longitudinal axis intersect, and (3) the opening central longitudinal axis does not intersect with the first axis when the knife is intercoupled to the bar of the cutting board by an indentation on the distal end of the blade;
  the blade connected to the handle; and
  the indentation at the distal end of the blade, wherein the indentation intercouples the knife along a second axis with the bar of the cutting board, wherein the knife is rotatable around the first axis while the indentation is intercoupled with the bar.

2. The apparatus of claim 1, wherein the bar is affixed to the cutting surface at a height above the cutting surface, wherein a largest width of the blade from a cutting edge of the blade to a spine of the blade is at least as wide as the height.

3. The apparatus of claim 1, wherein the blade comprises:

a cutting edge, wherein, when the indentation of the blade is intercoupled with the bar of the cutting board and the knife is rotated around the first axis to be in contact with the cutting board, the cutting edge is configured to be substantially flush with the cutting surface.

4. The apparatus of claim 1, wherein the blade comprises a plurality of holes in a particular pattern, wherein the particular pattern is configured to reduce a contact area between the blade and an object being cut by the blade.

5. The apparatus of claim 1, further comprising:

a weighted arm connected to the bar and extending along the second axis substantially perpendicular to the bar, wherein the weighted arm is rotatable around the first axis and slidable along the bar on the first axis.

6. The apparatus of claim 1, wherein the robotic limb comprises one or more robotic fingers, and wherein at least one of the one or more chambers is configured to intercouple with at least one of the one or more robotic fingers.

7. The apparatus of claim 1 further comprising:

a pair of grommets affixed to the bar and slidable along the bar on the first axis, wherein the indentation of the blade is configured to intercouple with the bar between the pair of grommets, wherein the pair of grommets stabilize movement of the blade along the first axis while the knife is rotating around the bar.

8. A method comprising:

causing a robotic limb to be intercoupled with a handle of a knife, wherein the knife intercouples with a bar affixed to a cutting surface, the bar being disposed along a first axis, wherein the knife comprises:

the handle at a proximal end of the knife, wherein a proximal end of the handle is opposite a distal end of the handle that is connected to a blade, and wherein the proximal end of the handle comprises one or more chambers configured to intercouple with the robotic limb, at least one of the one or more chambers having an opening with a central longitudinal axis that is angled relative to a second axis, wherein (1) the second axis is substantially perpendicular to the first axis along the knife, (2) the second axis and the opening central longitudinal axis intersect, and (3) the opening central longitudinal axis does not intersect with the first axis when the knife is intercoupled to the bar of the cutting board by an indentation on the distal end of the blade;

the blade connected to the handle; and the indentation at the distal end of the blade, wherein the indentation intercouples the knife along a second axis with the bar of the cutting board, wherein the knife is rotatable around the first axis while the indentation is intercoupled with the bar;

causing the indentation of the knife to be intercoupled with the bar of a cutting board, wherein the cutting board comprises:

the cutting surface; and the bar affixed to the cutting surface, wherein the bar is disposed along the first axis;

adjusting, by the robotic limb, a position of the knife along the bar to align with an object on the cutting surface;

rotating, by the robotic limb, the knife around the first axis toward the cutting surface to cut the object on the cutting surface.

9. The method of claim 8, wherein the blade further comprises:

a cutting edge, wherein, when the indentation of the blade is intercoupled with the bar of the cutting board and the knife is rotated around the first axis to be in contact with the cutting board, the cutting edge is configured to be substantially flush with the cutting surface to finish cutting the object, wherein the cutting edge is used to cut the object when rotating the knife around the first axis toward the cutting surface.

10. The method of claim 8, further comprising:

placing, by the robotic limb, the object on the cutting surface.

11. The method of claim 10, further comprising:

placing, by the robotic limb, a weighted arm on the object, wherein the weighted arm holds the object to the cutting surface, wherein the weighted arm is attachable to the bar and is rotatable around the first axis and slidable along the bar on the first axis.

12. The method of claim 8, wherein the blade further comprises:

a plurality of holes in a particular pattern, wherein the particular pattern is configured to reduce a contact area between the blade and the object being cut by the blade, wherein the plurality of holes causes the object to not stick to the blade once finished cutting the object.

13. The method of claim 8, further comprising:

sliding, by the robotic limb, a pair of grommets affixed to the bar to align with the object on the cutting surface, wherein the pair of grommets are slidable along the bar on the first axis, wherein the indentation of the blade intercouples with the bar between the pair of grommets, wherein the pair of grommets stabilize movement of the blade along the first axis while the knife is rotating around the bar to cut the object.

14. The method of claim 8, wherein the robotic limb further comprises:

one or more robotic fingers, wherein one or more of the robotic fingers is configured to intercouple with at least one of the one or more chambers of the handle when intercoupling the robotic limb to the handle of the knife.

15. A computer-readable non-transitory storage media comprising instructions executable by a processor to:

cause a robotic limb to be intercoupled with a handle of a knife, wherein the knife intercouples with a bar affixed to a cutting surface, the bar being disposed along a first axis, wherein the knife comprises:

the handle at a proximal end of the knife, wherein a proximal end of the handle is opposite a distal end of the handle that is connected to a blade, and wherein the proximal end of the handle comprises one or more chambers configured to intercouple with the robotic limb, at least one of the one or more chambers having an opening with a central longitudinal axis that is angled relative to a second axis, wherein (1) the second axis is substantially perpendicular to the first axis along the knife, (2) the second axis and the opening central longitudinal axis intersect, and (3) the opening central longitudinal axis does not intersect with the first axis when the knife is intercoupled to the bar of the cutting board by an indentation on the distal end of the blade;

the blade connected to the handle; and the indentation at the distal end of the blade, wherein the indentation intercouples the knife along a second axis with the bar of the cutting board, wherein the knife is rotatable around the first axis while the indentation is intercoupled with the bar;

cause the indentation of the knife to be intercoupled with the bar of the cutting board, wherein the cutting board comprises:

the cutting surface; and the bar affixed to the cutting surface, wherein the bar is disposed along the first axis;

adjust, by the robotic limb, a position of the knife along the bar to align with an object on the cutting surface;

rotate, by the robotic limb, the knife around the first axis toward the cutting surface to cut the object on the cutting surface.

16. The media of claim 15, wherein the instructions are further executable by the processor to:

place, by the robotic limb, the object on the cutting surface.

17. The media of claim 16, wherein the instructions are further executable by the processor to:

place, by the robotic limb, a weighted arm on the object, wherein the weighted arm holds the object to the cutting surface, wherein the weighted arm is attachable to the bar and is rotatable around the first axis and slidable along the bar on the first axis.

18. The media of claim 15, wherein the blade further comprises:

a cutting edge, wherein, when the indentation of the blade is intercoupled with the bar of the cutting board and the knife is rotated around the first axis to be in contact with the cutting board, the cutting edge is configured to be substantially flush with the cutting surface to finish cutting the object, wherein the cutting edge is used to cut the object when rotating the knife around the first axis toward the cutting surface.

19. The media of claim 15, wherein the blade further comprises:

a plurality of holes in a particular pattern, wherein the particular pattern is configured to reduce a contact area between the blade and the object being cut by the blade, wherein the plurality of holes causes the object to not stick to the blade once finished cutting the object.

20. The media of claim 15, wherein the robotic limb further comprises:

one or more robotic fingers, wherein one or more of the robotic fingers is configured to intercouple with at least one of the one or more chambers of the handle when intercoupling the robotic limb to the handle of the knife.

* * * * *